United States Patent [19]

Faulds

[11] Patent Number: 5,390,836
[45] Date of Patent: Feb. 21, 1995

[54] RECEPTACLE AND CO-OPERATIVE CARRIER THEREFOR

[76] Inventor: Kevin M. Faulds, 1137 Moselle Crescent, Orleans, Ontario, Canada, K1C 2S8

[21] Appl. No.: 104,620

[22] Filed: Aug. 11, 1993

Related U.S. Application Data

[62] Division of Ser. No. 691,616, Apr. 25, 1991, Pat. No. 5,238,160.

[51] Int. Cl.⁶ ................................................ B62J 7/00
[52] U.S. Cl. ................................... 224/32 R; 224/148; 224/42.45 R
[58] Field of Search ............ 224/42.45 R, 30 R, 52 R, 224/35, 37, 39, 148; 248/312.1, 313; 211/74; 220/379, 737, 740, 744, 338, 480, 481, DIG. 13; 215/1 C, 100 A; 280/288.4; 269/47, 126, 135, 155, 156, 254, 900

[56] References Cited

U.S. PATENT DOCUMENTS

| | | | |
|---|---|---|---|
| 1,159,491 | 11/1915 | Graham | 210/737 |
| 3,225,951 | 12/1965 | Poston et al. | 220/481 X |
| 4,823,975 | 4/1989 | Schwankl | 220/740 |

FOREIGN PATENT DOCUMENTS

| | | | |
|---|---|---|---|
| 44319 | 10/1938 | Netherlands | 248/313 |
| 269756 | 4/1927 | United Kingdom | 248/313 |

*Primary Examiner*—Henry J. Recla
*Assistant Examiner*—David J. Walczak
*Attorney, Agent, or Firm*—Dennis H. Lambert

[57] ABSTRACT

A combination unit of at least one canister and a mount is provided herein. The novel mount includes at least two laterally-spaced apart a base for securement to a selected surface. The base includes at least two laterally-spaced part angularly-upwardly-projecting support arms projecting from the base, and an upper, pivotally mounted, resiliently-sprung, e.g. spring biased lid. The receptacle is provided with two laterally-spaced apart depression slots which are adapted to mate with the two laterally-spaced apart support arms. A dispensing opening in the receptacle is adapted to be sealed automatically upon fitment of the receptacle with respect to the mount by actuated pivoting of the lid with respect to the mount by contact of a surface on the receptacle with a depending lever on the lid.

11 Claims, 13 Drawing Sheets

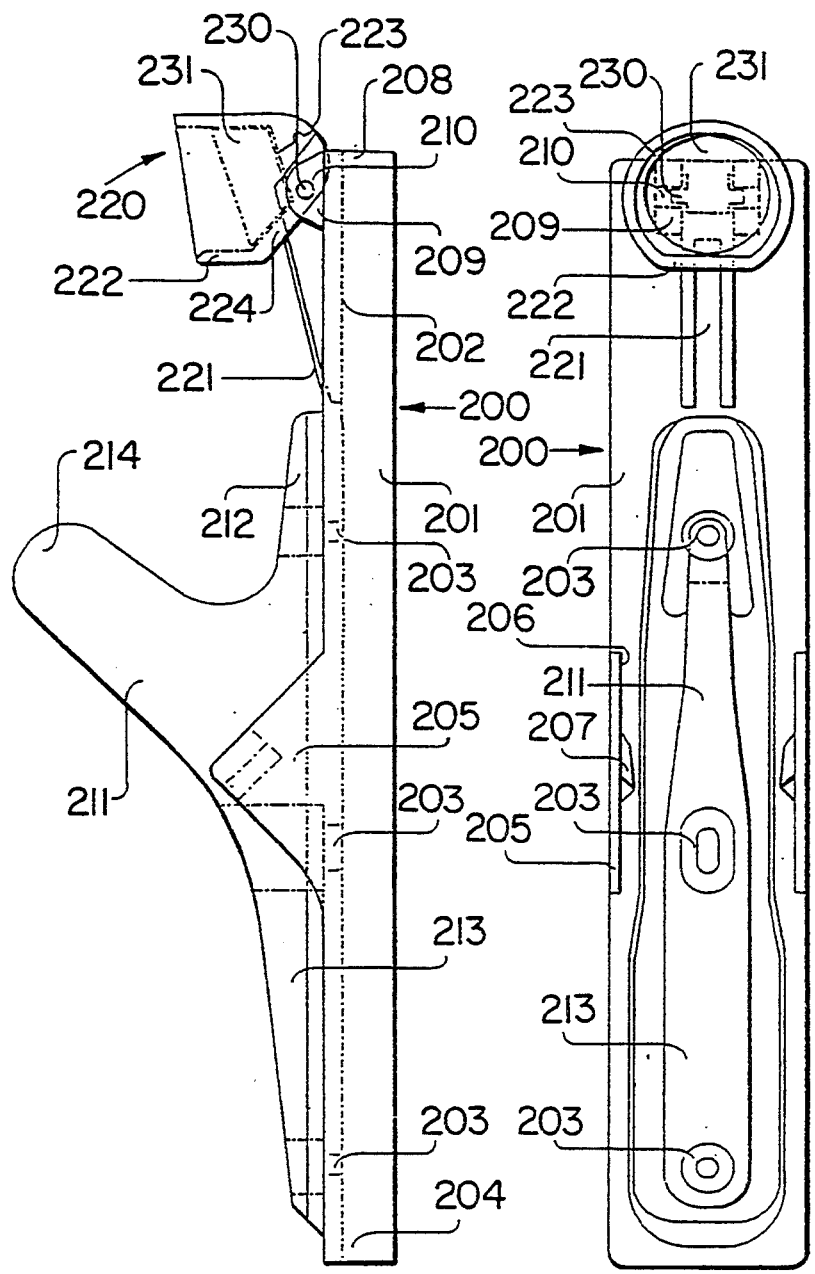
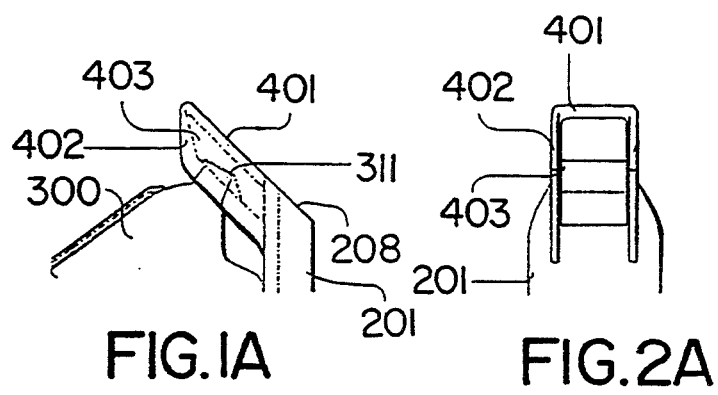
FIG.1  FIG.2
FIG.1A  FIG.2A

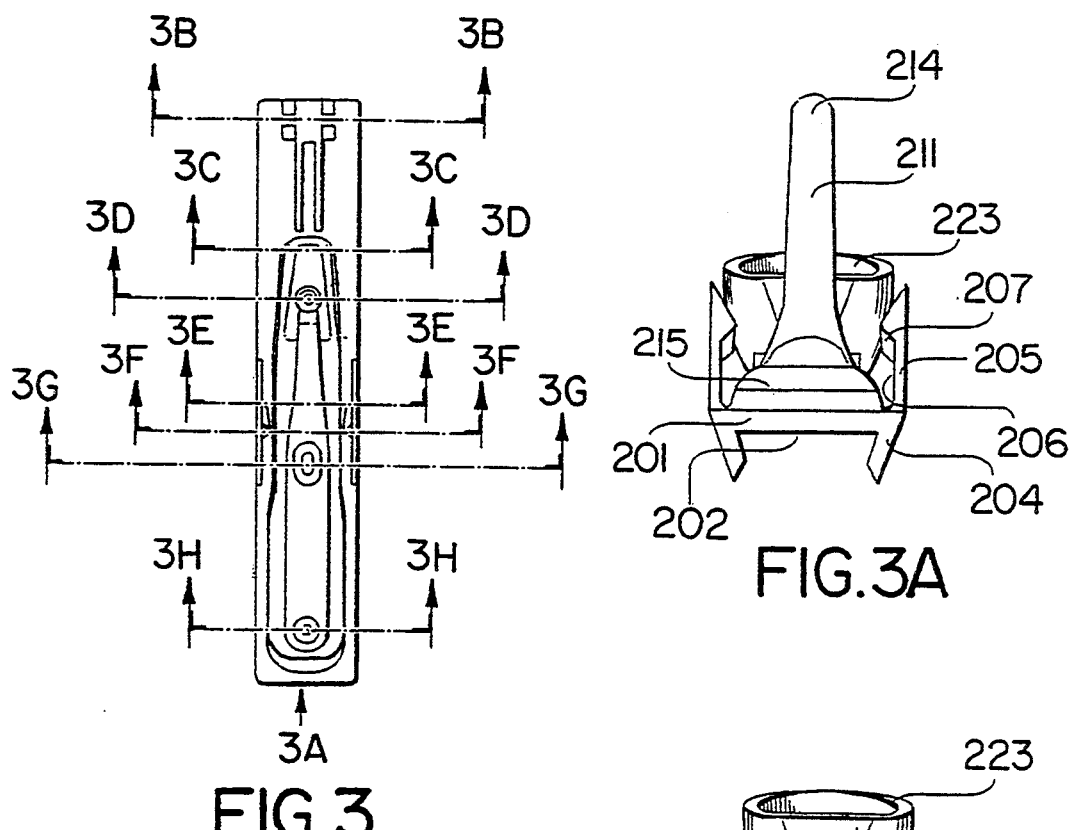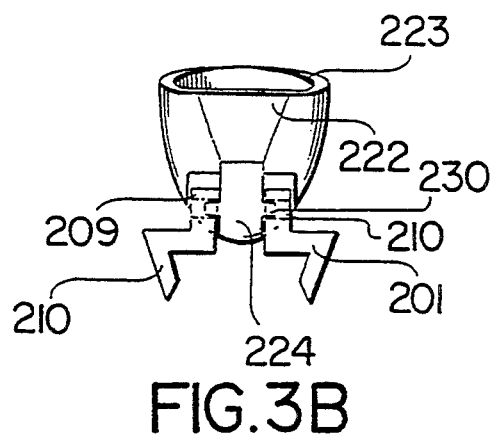

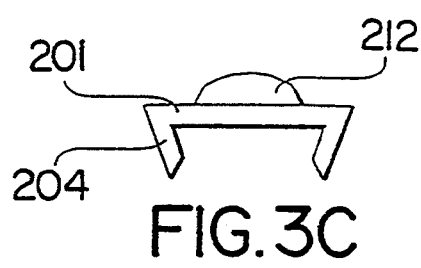 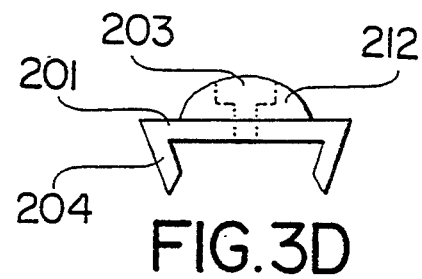
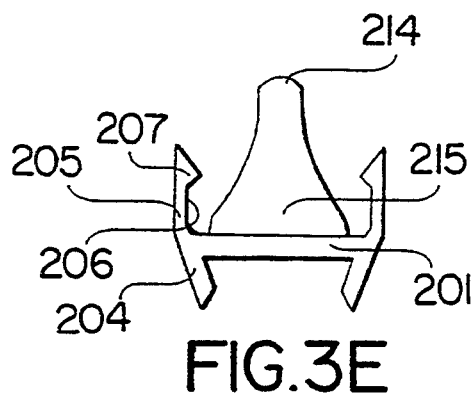 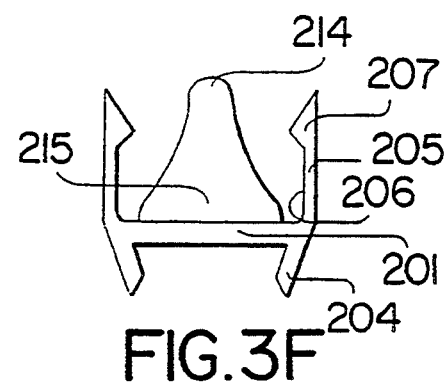
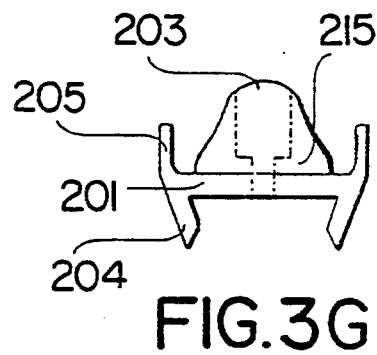 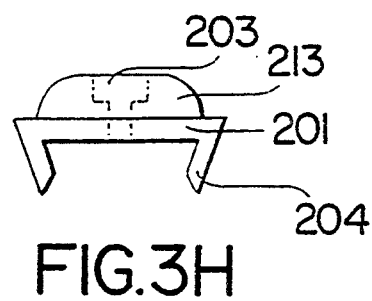

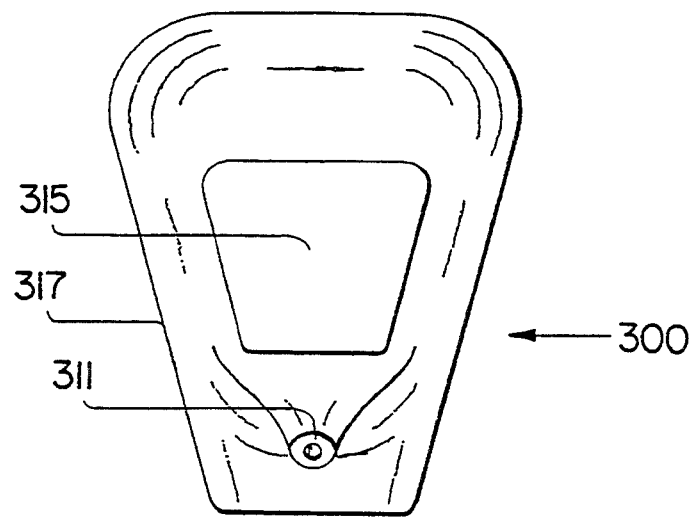
FIG. 6
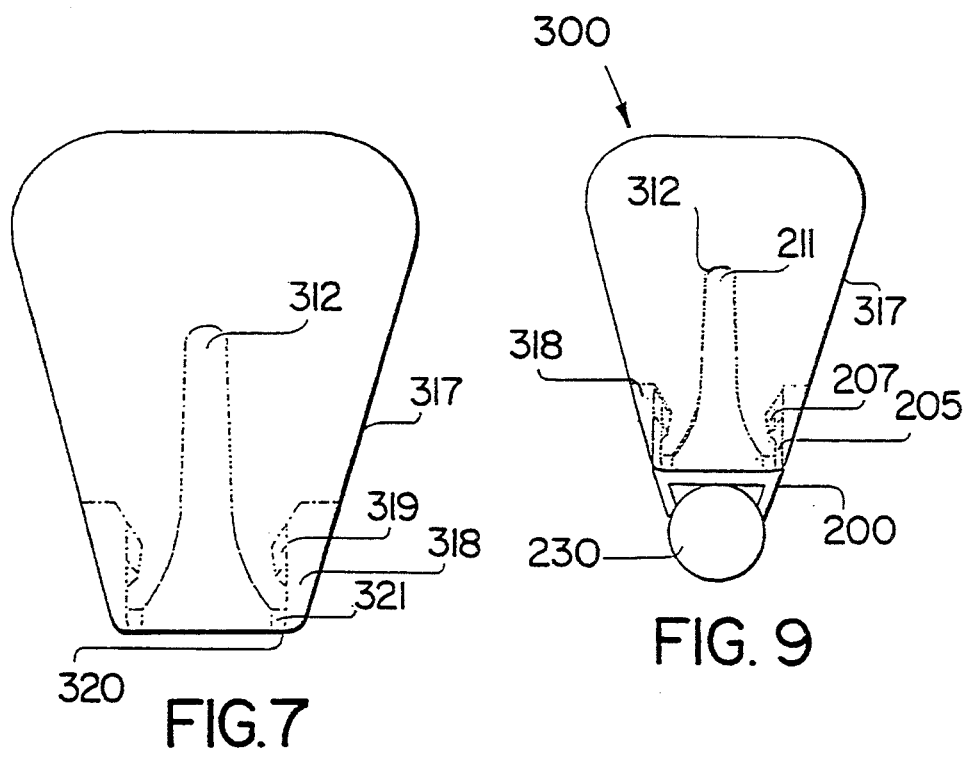
FIG. 7
FIG. 9

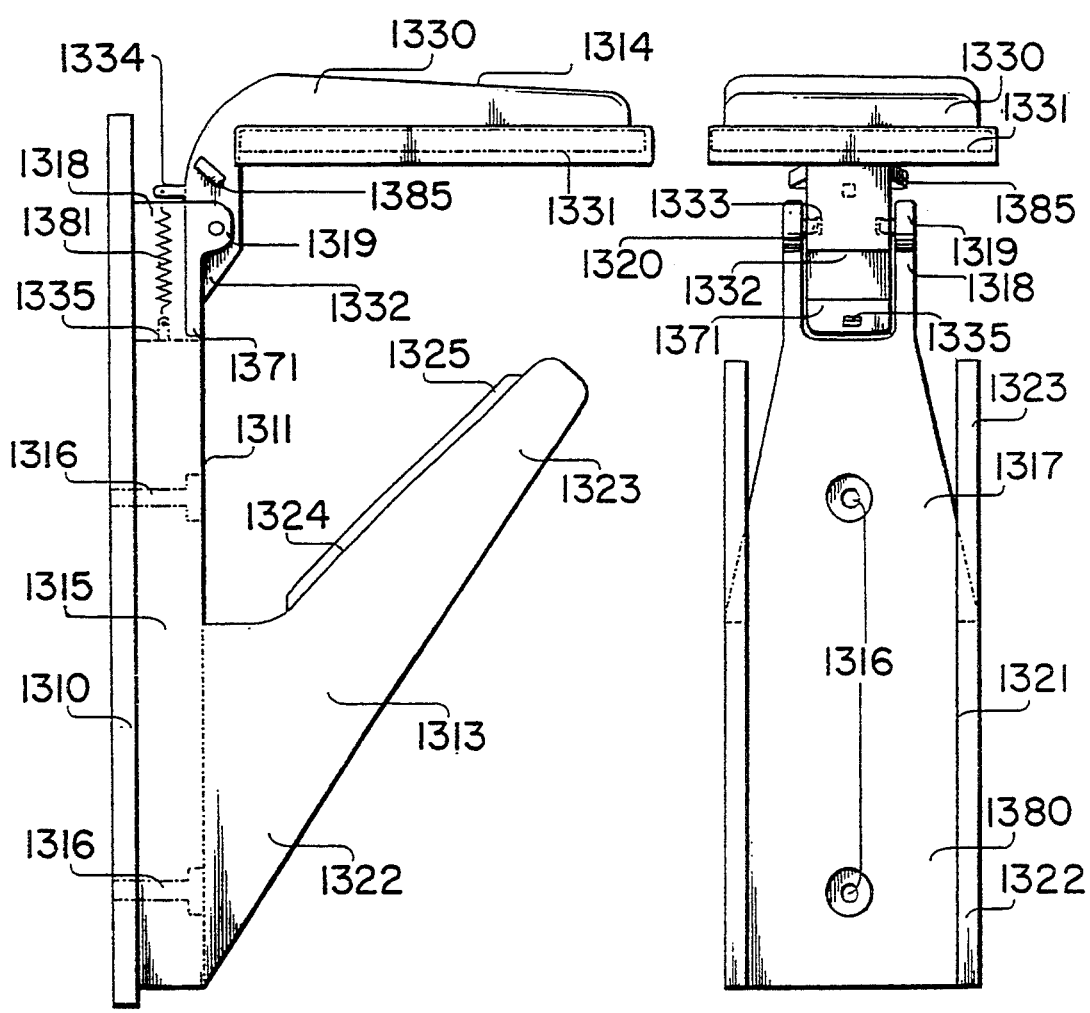

RECEPTACLE AND CO-OPERATIVE CARRIER THEREFOR

The present invention is a division of application Ser. No. 07/691,616, filed Apr. 25, 1991, now U.S. Pat. No. 5,238,160.

BACKGROUND OF THE INVENTION (i) Field of the Invention

This invention relates to a receptacle, e.g. a bottle and a co-operative carrier therefor, whereby the receptacle and the carrier are a unit. In one embodiment, it relates to a canister and cooperative canister carrier.

(ii) Description of the Prior Art

The art has in the past been faced with the problem of providing means for automatically sealing the container upon placing the bottle in the holder. Automatic such closure devices are also known.

U.S. Pat. No. 1,115,656 patented Nov. 3, 1914 by W. D. Fritschle provided a combined bottle closure and retaining device which included an upright flexible shank and a flexible looped end to which a stopper or cap was secured. The device was mounted on a shelf. When it was desired to place a bottle on the shelf and simultaneously to seal the bottle, it was necessary only to engage the open end of the bottle against the stopper so that the stopper just rose and then returned to a position closing the bottle.

U.S. Pat. 1,292,480 patented Jan. 28, 1919 by F. Kessel provided a support for table articles including a condiment holder support comprising a dish-shaped base attached to a resilient bracket carrying a cover. The condiment holders were inserted in the support by depressing the base with the base of the condiment holder, and placing the tip of the condiment holder under the cap.

U.S. Pat. No. 1,436,515 patented Nov. 21, 1922 by R. B. Mitchell provided a bottle holder which included an upper plate which could be sprung upwardly. A lower plate supported the neck of a bottle. The bottle could not be inserted or removed without upward springing of the upper plate.

U.S. Pat. No. 2,441,417 patented May 11, 1948 by T. J. Hopkins provided a rack for empty milk bottles in which the milk bottles were supported by means of a series of bottle-holding pins pivotally mounted thereon. The pins extended to an operative position and retracted to an out of the way position when not in use. The support was attachable to a wall at any desired height from the floor.

U.S. Pat. No. 2,710,694 patented Jun. 14, 1955 by R. R. Carr provided a condiment holder and closure for containers which included a shelf member having a rigid core. A foam or sponge rubber strip was secured to the core and was covered by a plastic sheet that would effectively seal and close the open end of a container. That operation retained the container in a sanitary condition.

U.S. Pat. No. 4,050,584 patented Sep. 27, 1972 by J. L. Lino provided a holder for open containers. The holder included a pair of confronting parallel surfaces, one of which supported a resilient material which was adapted to exert pressure against the open mouth of the container, thereby to seal and hold the container in place.

SUMMARY OF THE INVENTION (i) Aims of the Invention

An object of this invention is to provide a receptacle and mount combination in which a dispensing aperture in the receptacle is automatically closed by fitting the receptacle in the mount.

Yet another object of this invention is to provide a novel combination of a plurality of canisters in which each unit of the combination is assembled and disassembled in a smooth and easy manner while automatically closing the opening of the canister while the combination of canister and mount is being assembled.

(ii) Statement of Invention

The present invention provides a plurality of receptacles for use with a mount, each receptacle comprising a rectangular parallelepiped, open-topped receptacle (e.g. canister) having two laterally-spaced-apart means which are adapted to mate with laterally-spaced-apart support arm means, the spacing of a transverse space between the two laterally-spaced-apart means in the receptacle (e.g. canister) being the same as a space between a pair of co-operative support arm means, the open top of the canister being adapted to be closed by means of actuated pivoting of a lid.

The present invention provides a plurality of receptacles and a mount combination, the mount comprising a base, a lower plurality of pairs of laterally-spaced-apart, angularly-upwardly-projecting support arm means projecting from the base, and a plurality of upper pivotally-mounted, resiliently-biased outwardly-projecting lids; the receptacles each comprising a rectangular parallelepiped, open-topped receptacle (e.g. canister) having two laterally-spaced-apart means which are adapted to mate with laterally-spaced-apart co-operative support arm means, the spacing of a transverse space between two laterally-spaced-apart means in the receptacle (e.g. canister) being the same as the space between a pair of co-operative support arm means, the open top of the receptacle (e.g. canister) being adapted to be closed by means of actuated pivoting of the lid with respect to the base.

The present invention also provides a plurality of receptacles and a mount combination, the mount comprising a base, a plurality of lower pairs of laterally-spaced-apart, angularly-upwardly-projecting support arm means projecting from the base, and a plurality of an upper pivotally-mounted, spring-biased outwardly-projecting lids; the receptacles each comprising a rectangular parallelepiped, open-topped receptacle (e.g. canister) having two laterally-spaced-apart slots therein of the same complementary shape and size and location as, and adapted to mate with, co-operative support arm means, the spacing of a transverse space between the two laterally-spaced-apart slots in the receptacle (e.g. canister) being the same as the space between a pair of co-operative support arms means, the open top of each canister being adapted to be closed by a respective lid by means of actuated pivoting of the respective lid with respect to the base.

(iii) Other Features of the Invention

By one feature of the present invention, each of such support arm means is preferably, of generally rectangular cross-section. Such support arm means, in plan view, includes a wide lower body portion converging to a narrower free end portion. The length of each such support arm means is the same as the length of the slot in the canister within which it is adapted to fit.

The pivotally-mounted spring-biased lid is spring-biased by means of co-operation with a fitted spring.

The lids may be mounted between a pair of support risers projecting from the base of the mount. The pivotal mounting may be achieved by spaced-apart stubs on the support risers fitting into pivot wells in the lids, or it may be achieved by a pin passing through aligned apertures in the lid and the support risers.

The actuated pivoting of the lid to seal the canister is preferably achieved by means of a depending arm on the lid cooperating with an actuating face on the upper portion of the canister.

BRIEF DESCRIPTION OF THE DRAWINGS

In the accompanying drawings,

FIG. 1 is a side elevational view of the carrier forming part of the present invention disclosed in the parent application;

FIG. 1A is a side elevational view of an upper portion of the carrier forming part of the present invention disclosed in the present application;

FIG. 2 is a plan view of the carrier forming part of the present invention disclosed in the parent application;

FIG. 2A is a plan view of an upper portion of a carrier forming part of the present invention disclosed in the parent application;

FIG. 3 is a plan view of a carrier showing the location of the sections 3A–3H;

FIGS. 3A–3H are front elevational views of the carrier as viewed from arrows 3A–3H respectively of FIG. 1;

FIG. 6 is a top plan view of the bottle of FIG. 4;

FIG. 7 is a bottom plan view of the bottle of FIG. 4;

FIG. 9 is a bottom plan view of the bottle/carrier combination of FIG. 8, including a bicycle frame member mounting surface;

FIGS. 11–16 are views of a second embodiment of this invention disclosed in the parent application in which FIG. 11 is a side elevational view of the carrier forming part of that embodiment;

FIG. 12 is a top plan view of the carrier of FIG. 11;

FIG. 13 is a side elevational view of the container used with the carrier of FIG. 11 to provide the second embodiment of this invention diclosed in the parent application;

FIG. 14 is a rear or back elevational view of the container of FIG. 13;

FIG. 15 is a top plan view of the containers of FIG. 13;

FIG. 16 is a side elevational view of the container/carrier of this embodiment of this invention disclosed in the parent application in the form of a salt and pepper set;

FIGS. 17–24C are views of this invention, in which

FIG. 17 is a front elevational view of the base board forming part of the invention;

FIG. 18 is a side elevational view of the base board and carrier forming part of the invention;

FIG. 19 is a front elevational view of the carrier of FIG. 18;

FIG. 20 is a side elevational view of the canister forming part of the invention;

FIG. 21 is a front elevational view of the canister of FIG. 20;

FIG. 22 is a top plan view of the canister of FIG. 20;

FIG. 23 is a side elevational view of the canister/carrier combination of this invention; and FIGS. 24A–24C are sequential side elevational views of the canister/carrier combination of FIG. 24 showing the removal of the canister from the carrier.

Figures 4, 5:
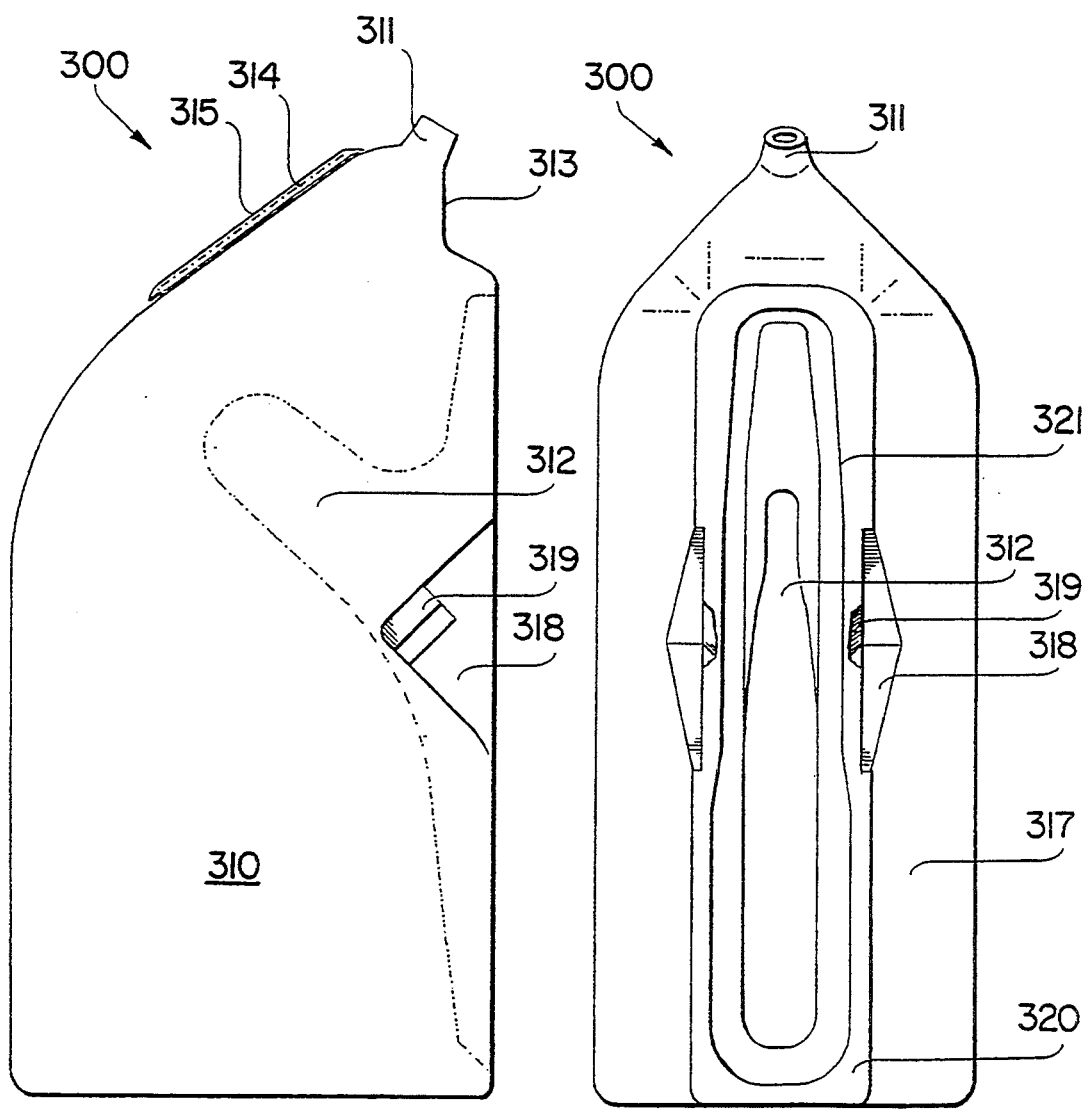
FIG. 4 is a side elevational view of the bottle forming part of the present invention disclosed in the present application.
FIG. 5 is a back or rear elevational view, i.e. the carrier contact surface side, of the bottle of FIG. 4.

DESCRIPTION OF PREFERRED EMBODIMENTS (i) Description of First Through Tenth Embodiments of FIGS. 1–9

As seen in FIGS. 1–3H inclusive, the carrier 200 includes a rectangular plate 201 which has a flat bottom face 202 through which three spaced-apart holes 203 are drilled and which is also provided with converging support flanges 204. The plate 201 is provided with a pair of laterally-spaced-apart gripping or locking tab support members 205, which are either formed integral with, or are welded to, the plate 201 parallel to its central longitudinal axis and at the marginal edges thereof. Each member 205 is substantially triangular in side elevation. Projecting from each inner face 206 of member 205 is a rhomboidally-shaped gripping projection or tab 207.

The upper end 208 of the plate 201 is provided with a pair of lateral ears 209, each being provided with a bore 210 therethrough whose purpose will be described hereinafter.

Disposed along the central longitudinal axis of the carrier plate 201 is an alignment and support arm 211. The alignment and support arm 211, in side elevational view includes shallow upper and lower reaches 212, 213, and a central area from which extends an outwardly projecting finger 214.

As seen in FIGS. 3A–3H, the support arm 211 includes a broad base 215 which merges to narrow finger 214. The views in FIGS. 3A–3H show the variations in appearance of the plate 201 and the alignment and support arm 211 at selected points in the length of 204.

The lateral ears 209 are each provided with a bore 210 through which pivot pin 230 is mounted. The hood 220 cooperates with spring means 221 which is provided on carrier 200, so that it is sprung upwardly to the position shown in FIGS. 1 and 2.

As seen in FIGS. 1 and 2, the pivotally-mounted hood 220, is mounted within a bracket defined by the two laterally-spaced-apart ears 209.

The front view of the hood 220 shows that the hood 220 includes an inner well 223, which may be lined with a resilient sealing element 231. The side view shows a lower protruding chin 222. The lower face 224 of the hood 220 acts as a reaction surface against the spring 221 to provide the hood 220 in a spring orientation.

An alternative structure of co-operative bottle sealing means is shown in FIGS. 1A and 2A. As seen in FIGS. 1A and 2A, the upper end 208 of plate 201 supports an angularly-upwardly-projecting channel defined by side walls 402 and a closure surface 401 which is fitted with a sealing resilient block 403.

FIGS. 4–7 show one embodiment of the bottle 300. The bottle 300 includes a main chamber 310, provided with a dispensing spout 311. A deep well 312 formed within the interior chamber 310 of the bottle 300, well 312 being complementary in shape and size to that of the support arms 211. The bottle is also provided with a hood-closing reaction surface 313 adjacent the dispensing spout 311. In addition, the bottle 300 includes a refilling aperture 314, fitted with a sealing lid 315.

As seen more clearly in FIGS. 4, 5 and 7, the side walls 317 of the bottle are each provided with a well 318 of the same complementary shape and size as the lock tab support walls 205 including a further depression 319, of the same complementary size and shape as the rhomboidally-shaped gripping projections 207. The rear face 320 of the bottle 300 is provided with a guiding peripheral internal ledge 321 which is complementary to the base of the support arm 211 adjacent to surfaces 212 and 213.

(ii) Description of the Eleventh Through Fourteenth Embodiments of FIGS. 11–16

FIGS. 11–16 show a second embodiment of the present invention in the form of a salt and pepper set 1200.

Figure 12:
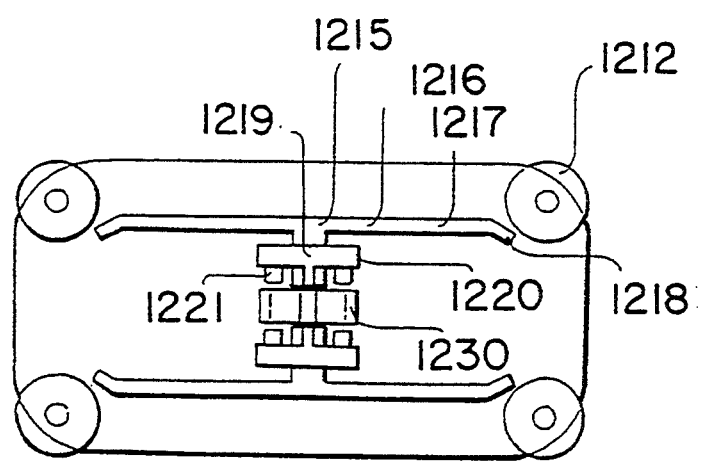

The carrier 1210 of the set 1200 includes a,flat base 1211 from which a plurality, e.g. four suction cups 1212 project to secure the carrier 1200 to a flat surface (not shown). The upper face 1213 of the base 1211 is provided with an upright central post 1214, from which a laterally-spaced-apart pair of double support arms 1215 project. Each of the pairs of double support arms 1215 includes, in side elevation, a generally rectangular base 1216, and, projecting upwardly and longitudinally outwardly, a support finger 1217. As seen in FIG. 12, the cross-sectional shape of the arms 1215 is generally rectangular, and the tips of the fingers 1217 are inwardly bent at 1218.

The central post 1214 also supports a pair of laterally-spaced-apart cap supporting arms 1219. Each of the cap supporting arms 1219 includes a pair of longitudinally-directed ears 1220 each provided with an inwardly directed stub shaft 1221.

The upper end 1222 of the central post 1214 is provided with a pair of hingedly mounted caps 1223 mounted to the cap supporting arms 1219. Each cap 1223 includes a main cap portion 1227 and an inner sealing portion 1224, as well as a depending arm 1225. The cap supporting arms 1219 includes the transverse ears 1220 provided with a pair of stub shafts 1221 near the end thereof. The cap 1223 includes an aperture 1228 within which the stub shaft 1221 projects to secure the respective cap 1223 to the central post 1214. The central post 1214 is provided with a pair of outwardly projecting springs 1230 to cooperate with depending arm 1225 to control the opening and closing of the cap 1223.

Figure 13:
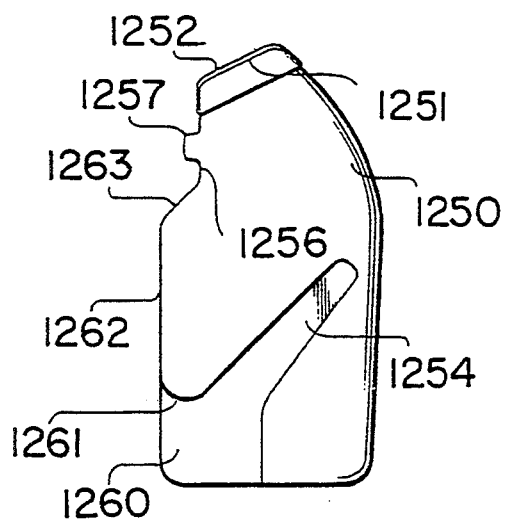
Figure 14:
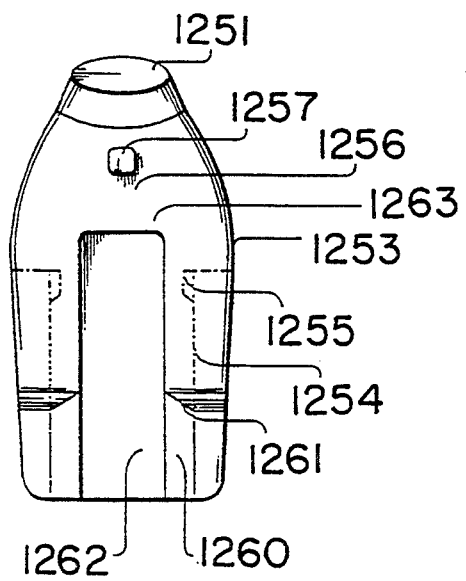
Figure 15:
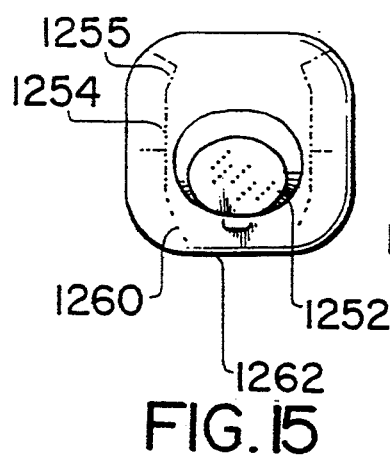

FIGS. 13–15 show various views of a container for use with the carrier 1210, i.e. a salt or pepper shaker 1250. Shaker 1250 includes an upper filling opening 1251 covered with a perforated cap 1252. The side walls 1253 are each provided with a depressed face 1254 of the same complementary size and shape and location as support arm 1215. Such depressed face 1254 is also provided with a shallow well 1255 of the same complementary size and shape and location as gripping projections 1218. The upper rear face 1256 of the shaker 1250 is provided with a cap-operating protrusion 1257. For ease of alignment the channel 1260 tapers from depressed face 1254 to the rear face 1262. The rear face 1262 is provided with an angled portion 1263 to provide the operative face. The channel 1260 is provided with an upper edge 1261.

(iii) Description of the Present Invention of FIGS. 17–25C

Figure 17:
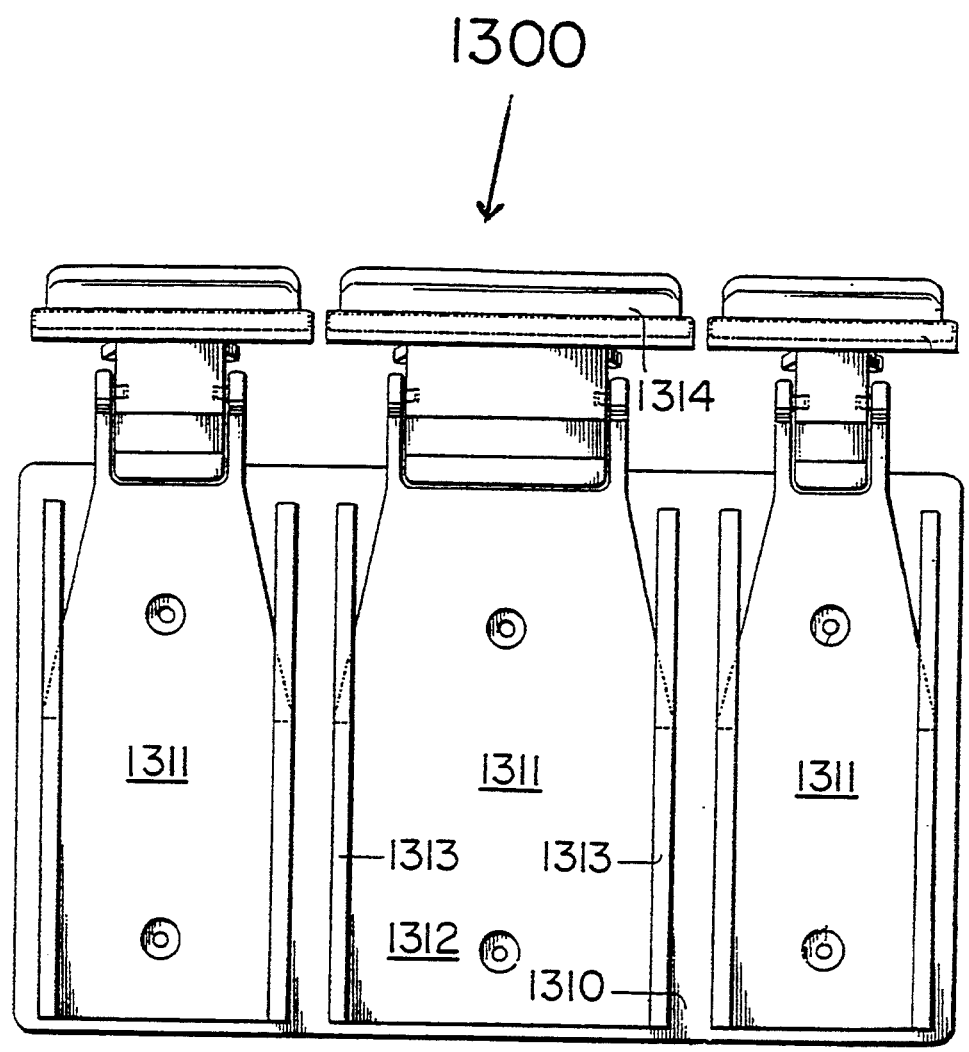

FIGS. 17–23 show a carrier/container of this invention in the form of a canister set 1300. FIGS. 17–19 show one suitable configuration of carrier 1211.

As seen in FIG. 17, this invention includes a base board 1310 on which is mounted the carrier 1311 of this embodiment. It is observed that the base board may be omitted, and the carrier 1311 may be mounted directly on any suitable wall surface, if it is desired to have only one canister/carrier, or if the spacing of a plurality of canister/carrier sets is to be selected at will. The carrier 1311 includes a base plate 1312, a pair of spaced-apart, upwardly projecting support arms 1313 and a spring, hingedly mounted lid 1314. A detailed view of the carrier 1311 is shown in FIGS. 18 and 19.

The carrier 1311 includes a base 1315 provided with a pair of holes 1316 therethrough by means of which the base 1315 may be secured to the wall surface (not shown) or to a base board 1310 (as shown in FIG. 17). In plan view, the base 1315 includes a lower rectangular section 1380, and a mid converging section 1317, which is capped by a pair of spaced-apart arms 1318. Each arm 1318 is provided with a projecting ear 1319 which includes an inwardly directed stub shaft 1320. The lateral edges 1321 of base 1315 are each provided with a support arm 1313 in the form of a wide base portion 1322 and a projecting upper finger portion 1323. The inner upper edge 1324 of the finger portion 1323 is provided with a guiding edge 1325.

The upper portion 1318 of the base 1311 is fitted with a lid 1314. Lid 1314 includes a head 1330 including a lower sealing face 1331 and a central depending tongue 1332. Tongue 1332 includes a pair of lateral wells 1333 within which the stub shafts 1320 are fitted in order to provide the hinged connection of the lid 1314 to the carrier 1311. Tongue 1332 is provided with raised portions 1385 to affect a mechanical stop for the maximum open position of the lid 1314 by resting against the top of portion 1318. A projection 1334 on the tongue 1332 cooperates with member 1335 on carrier 1311 to support a spring securement 1381 of the lid 1314 to the carrier 1311.

Figures 20, 21:
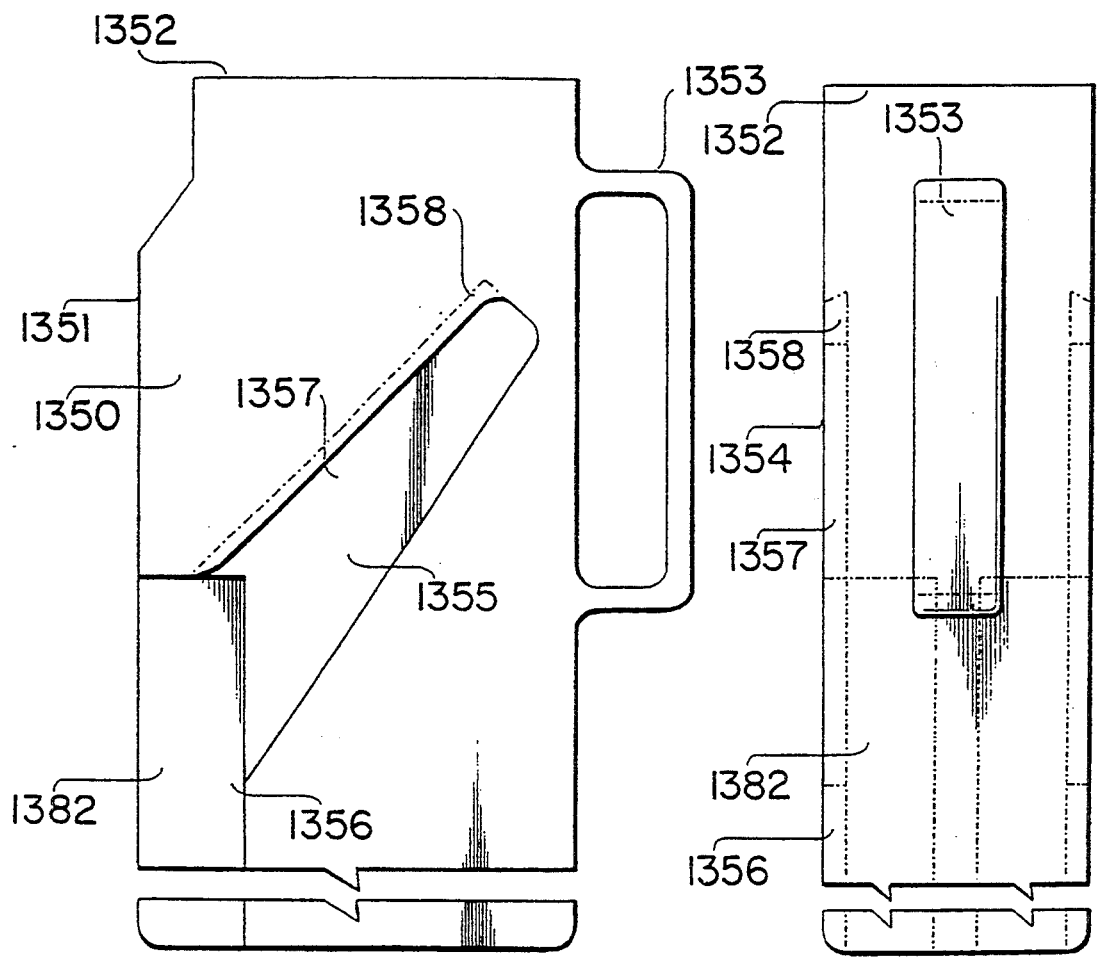
Figure 22:
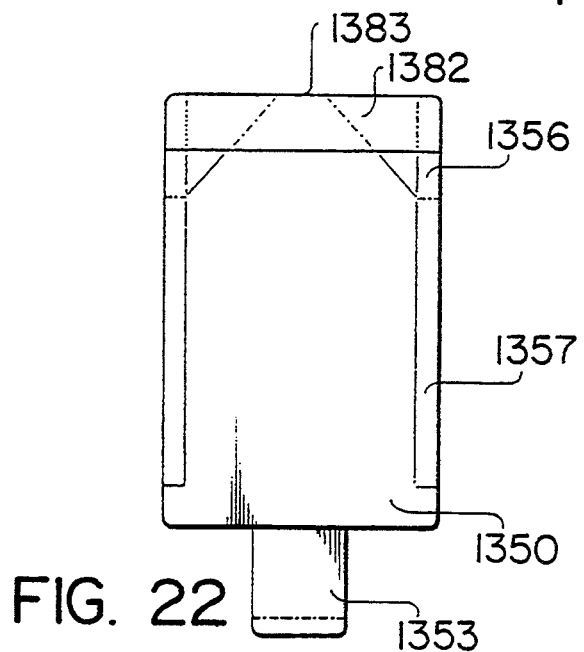

FIGS. 20, 21 and 22 show the construction of a typical canister 1350 for use in combination with the carrier 1311. Canister 1350 is generally box-shaped, in the form of a geometric figure referred to as a generally-rectangular parallelepiped, 1351, provided with an open top 1352 and a handle 1353. Each side wall 1354 is provided with a depression 1355, in the form of a rectangular portion 1356 which is of tapered form from each side wall 1354 to the associated rear wall 1383, as shown at triangular sections 1382, (for ease of alignment, the side wall 1354 is not identical in shape as the lower portion 1322 of the support arm), and an upper diagonal slanted portion 1357 (of the same complementary shape, general size and orientation as the upper finger 1323). A guiding depression way 1358 is also provided in each wall 1354 of the same complementary shape, size and orientation as guiding edge 1325.

OPERATION OF PREFERRED EMBODIMENTS (i) Operation of Embodiment of FIGS. 8, 9 and 10A–10C In operation, the carrier 200 is secured to a frame member 230 of a bicycle (see FIG. 9) by means of screw securement through at least two of the holes 203 so that the inwardly toed flanges 204 contact the frame member 230, and so that its angularly-upwardly-projecting support arm 211 is exposed, and so that its gripping support means 205, 207 project outwardly from lateral side edges of the plate 201 of the carrier 200. The hood 220 is sprung so that it is in its outward or "ready" orientation.

To secure the bottle 300 to the carrier 200, the bottle 300 is mated with the carrier as follows: the alignment support means 211 is introduced into the female alignment means 312, and the support arm 211 is introduced into the deep well 312 of the bottle 300. The bottle 300 is urged angularly-downwardly. The locking tab means 205, thus mates with the female alignment means 318, within the side edges of the bottle 300 and the support arm 211 mates with the deep well 312 of the bottle 300. Reaction surface 313 of the bottle 300 engages the lower projecting chin 222 of the hood 220. Continued downward urging causes the lock tab 207 to clamp the bottle 300 to the carrier 200 by mating with depression 319 and places the sealing inner face 231 of the hood 220 into sealing engagement with the dispensing aperture 311 of the bottle 300. The bottle 300/carrier 200 combination is shown in FIGS. 8 and 9.

To remove the bottle 300 from the carrier 200, the opposite action, i.e. upward movement of the bottle 300 takes place. This is shown sequentially in FIGS. 8 and 10A–10C.

Another way of describing the operation of these embodiments is with reference to FIG. 9. The carrier 200 may be secured to a frame member 230 of a bicycle by screw securement through at least two of the holes 203 in the carrier base plate 201 so that the inwardly toed flanges 204 of the carrier contact the frame member and so that the alignment arm 211 projects angularly-upwardly. For proper operation, the carrier must be secured in a position on the bicycle frame so that the support arm is exposed. Once so secured, the gripping support walls 205 project outwardly from lateral side edges of the base plate 201 of the carrier 200.

Figure 8:
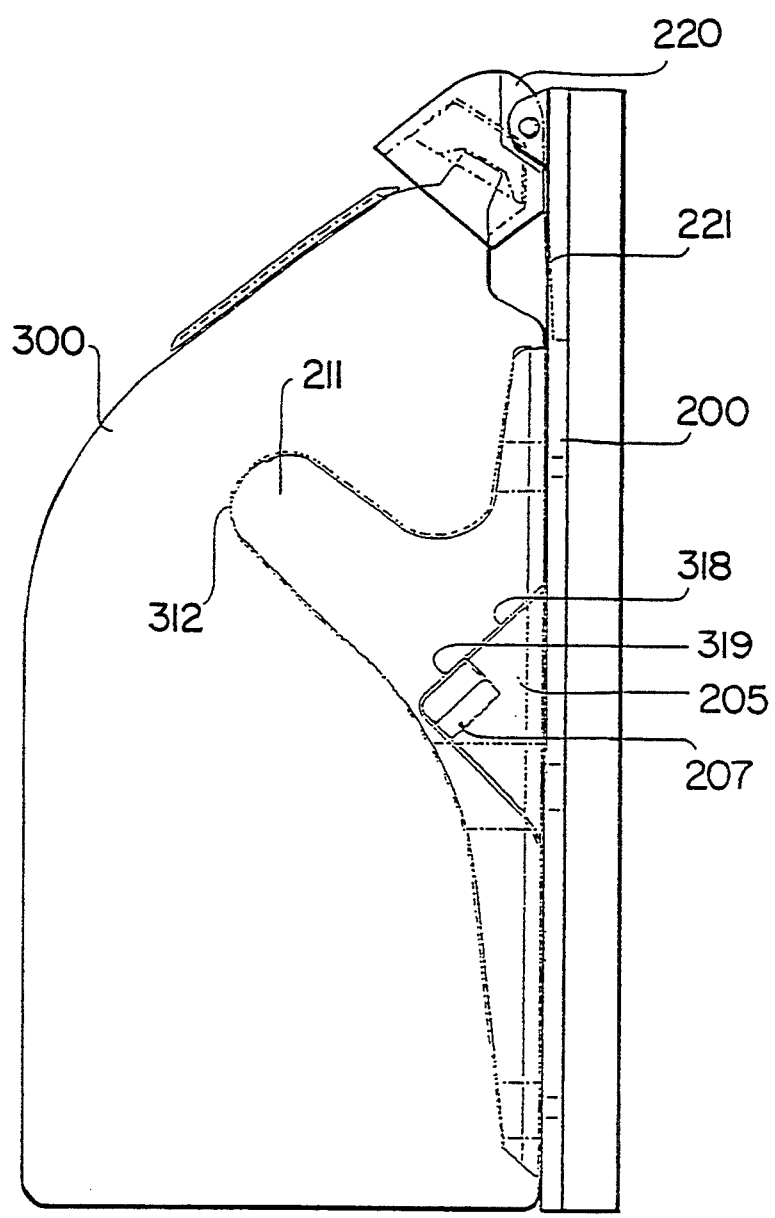
FIG. 8 is a side elevational view of the bottle/carrier combination of one embodiment of this invention disclosed in the present application.
Figure 10C:
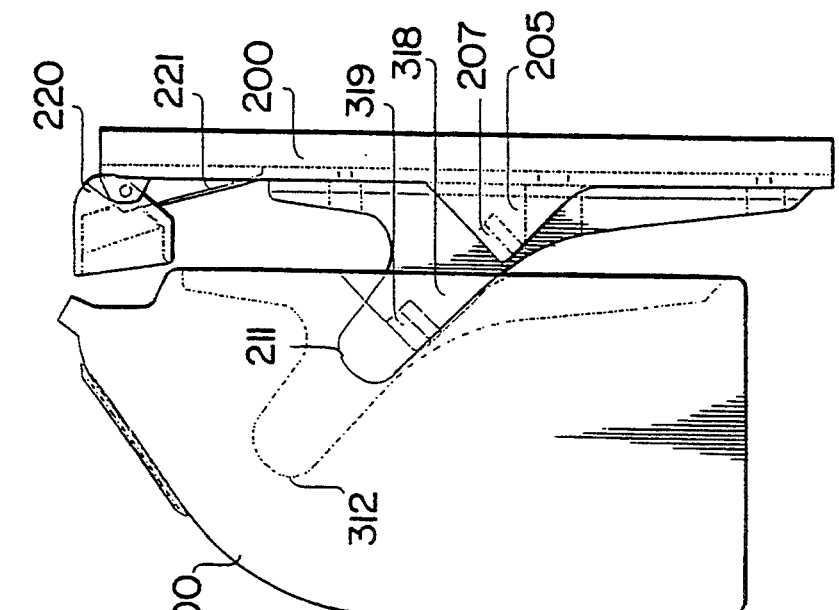
FIGS. 10A–10C are sequential side elevational views of the bottle/carrier combination of FIG. 9 showing the removal of the bottle from the carrier.
Figure 10B:
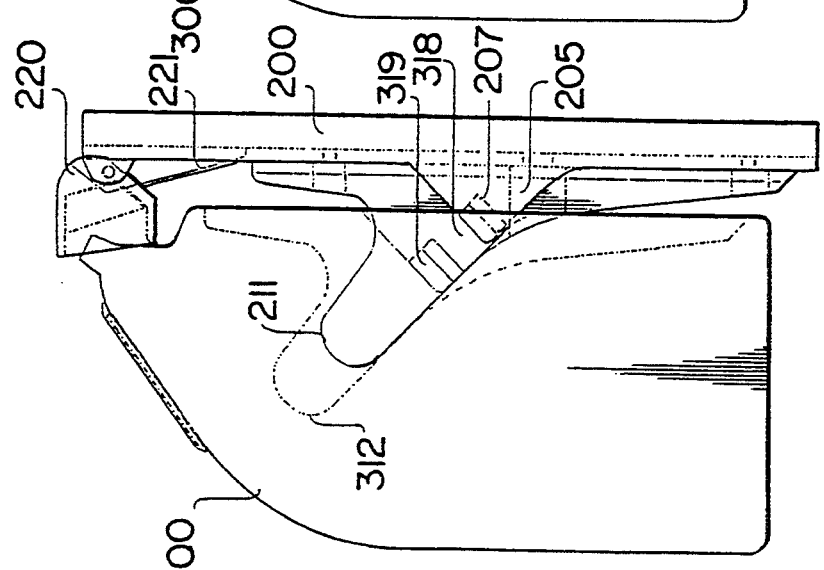
Figure 10A:
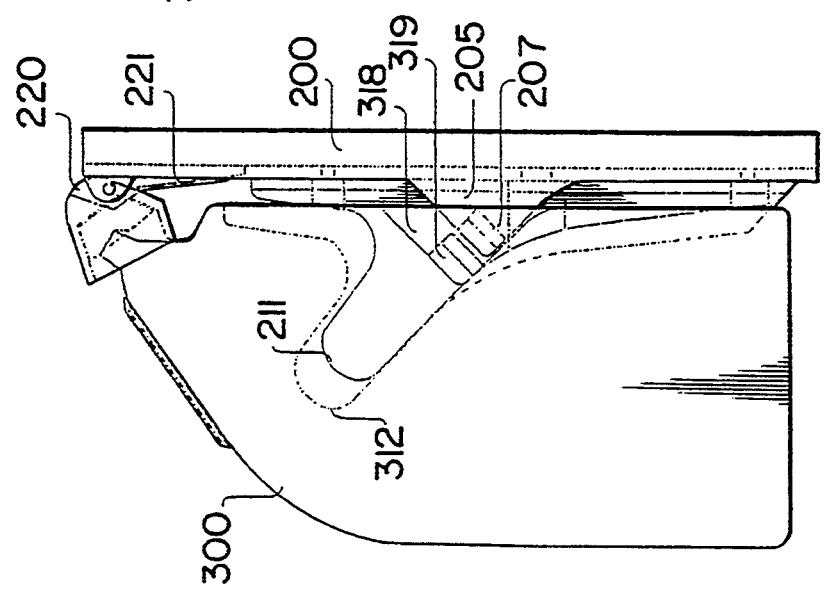
Figure 11:
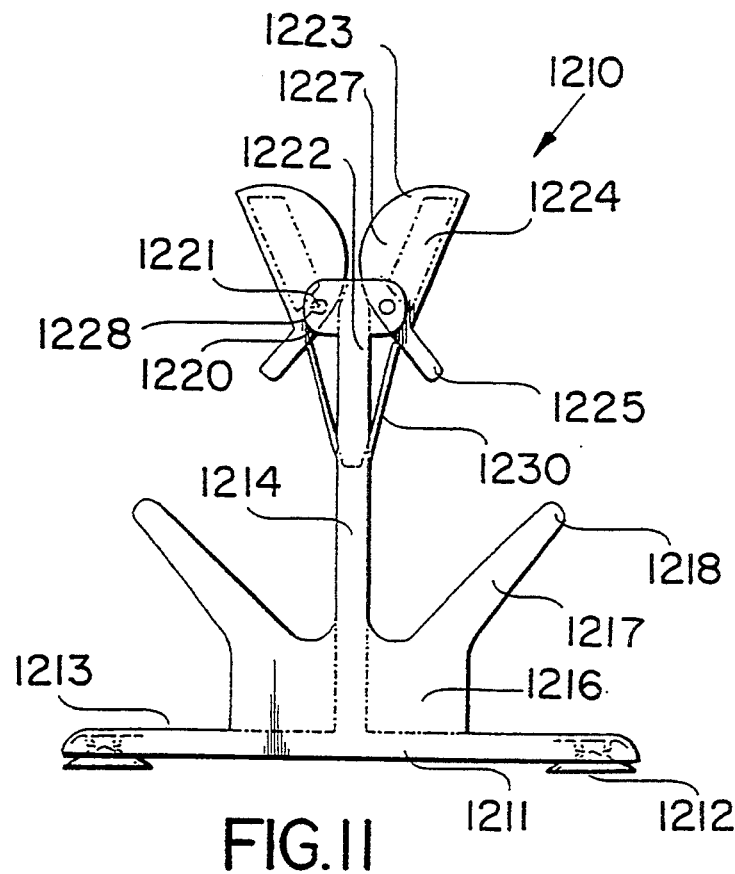

With reference to FIGS. 8 and 10A to 10C, in order to secure a bottle 300 to the carrier 200, the hood 220 must be sprung so that it is in its outwardly facing "ready" orientation illustrated in FIG. 10C. The bottle may then be mated with the carrier as follows. The alignment arm 211 of the carrier is introduced into the deep well 312 of the bottle (FIG. 10A). As the bottle is moved angularly-downwardly guided by the alignment arm, the gripping support walls 205 are introduced into the indentations 318. Continued downward urging of the bottle causes the reaction surface 313 of the bottle to first abut the lower projection chin 222 of the hood 220 (FIG. 10B) and then deflect the hood against the urging of spring 221 (FIG. 10C). Further downward urging of the bottle causes the gripping tabs 207 of the gripping support walls 205 to snap into the notches 319 in the bottle in order to lock the bottle in position on the carrier. Simultaneously, the reaction surface 313 of the bottle pushes the hood 220 to its closed position in sealing engagement with the dispensing aperture 311 of the bottle 300 (FIG. 8).

To remove the bottle from the carrier, the sequence of events is reversed, as shown sequentially by FIGS. 8 and 10A through 10C.

In the embodiment shown in FIG. 1A and FIG. 2A, the operation of the alignment arm 211 and the well 312 is the same. The resilient block 403 attached to the angularly-upwardly-projecting closure surface 401 contacts the spout opening 311 of the bottle as the bottle is urged downwardly, thereby creating sealed closure. The removal of the bottle is achieved by following the reverse steps.

Figure 16:
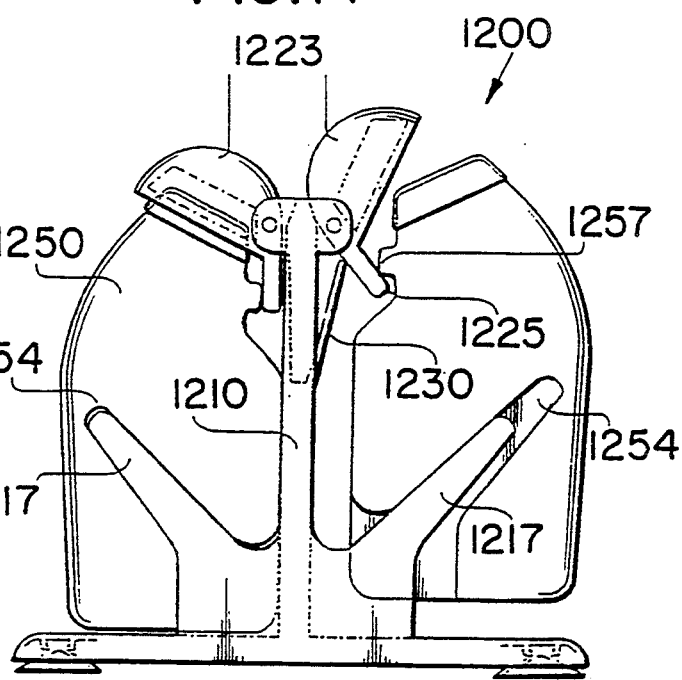

(ii) Operation of Embodiment of FIG. 16

The operation of this second embodiment of this invention is substantially the same as the operation of the first embodiment of the invention previously described. Thus, the depressed faces 1254 of the shaker 1250 are aligned between the support arms 1217 of the carrier 1210 and downward pressure is initiated. At this time the protrusion 1257 on the shaker 1250 engages the depending arm 1225 on the cap 1223 to urge the cap 1223 downwardly against the action of the spring 1230. The downward pressure is continued until the well 1255 of the shaker 1250 to grip the shaker 1250. At this time the cap 1223 is in its over-centre, fully down and sealed orientation, as seen in the left-hand side of FIG. 16. The right-hand side of FIG. 16 shows the shaker 1250 either in its starting position for securement to the carrier 1210, or in its final position prior to its removal from the carrier 1210.

(iii) Operation of the Canister of this Invention of FIGS. 23 and 24A–24C

Figure 23:
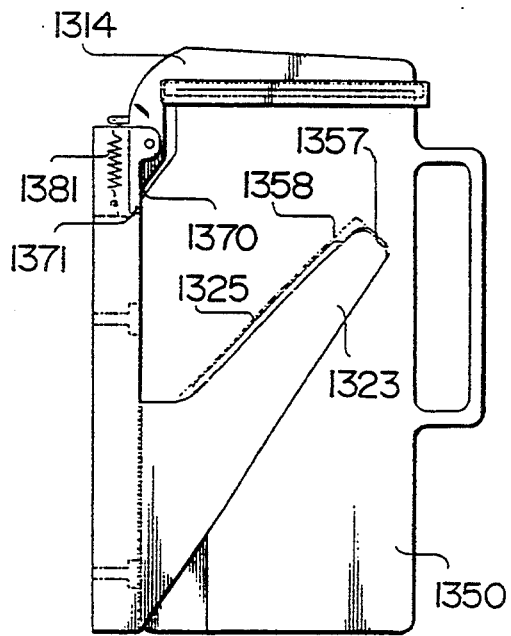

The operation of this embodiment of this invention is substantially the same as the operation of the first and second embodiments of FIGS. 1 to 16 previously described. Thus, the depressed faces 1356, 1357 of the canister 1350 are aligned between the support arms 1313 of the carrier 1310 and downward pressure is initiated. At this time, the reaction face 1370 on the canister 1350 engages the depending lever 1371 on the lid 1314 to urge the lid 1314 downwardly against the action of the spring 1381. The downward pressure is continued as the guiding edge 1325 of the carrier 1310 enters the shallow ways 1358 of the canister 1350. This is seen in FIG. 23.

Figure 24A:
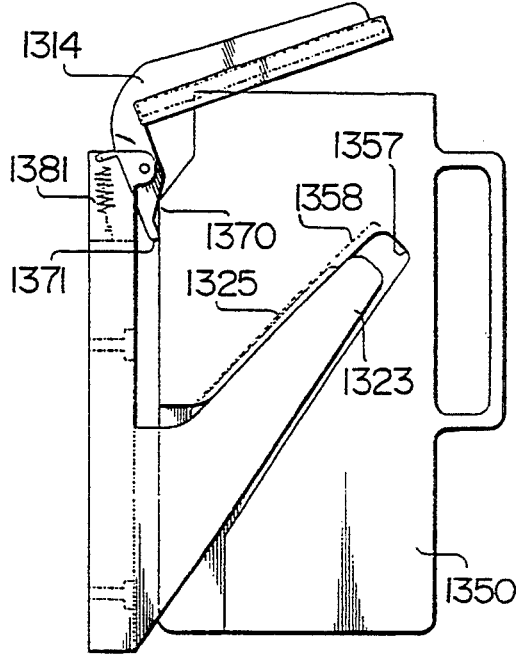
Figure 24B:
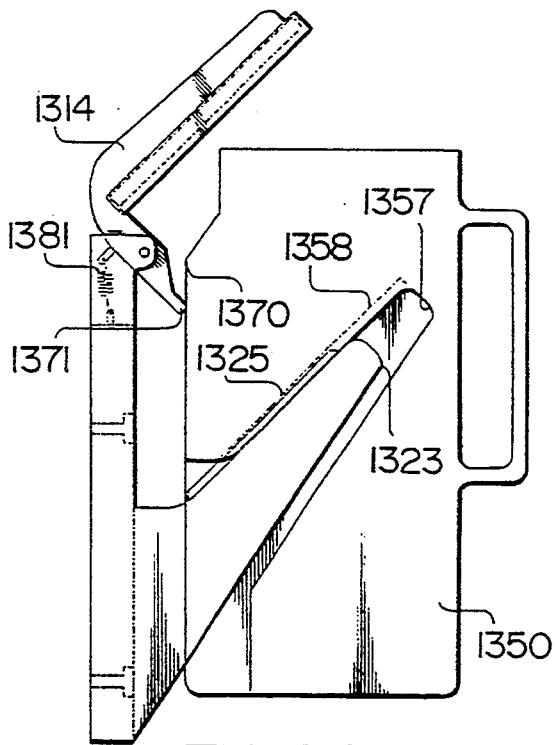
Figure 24C:
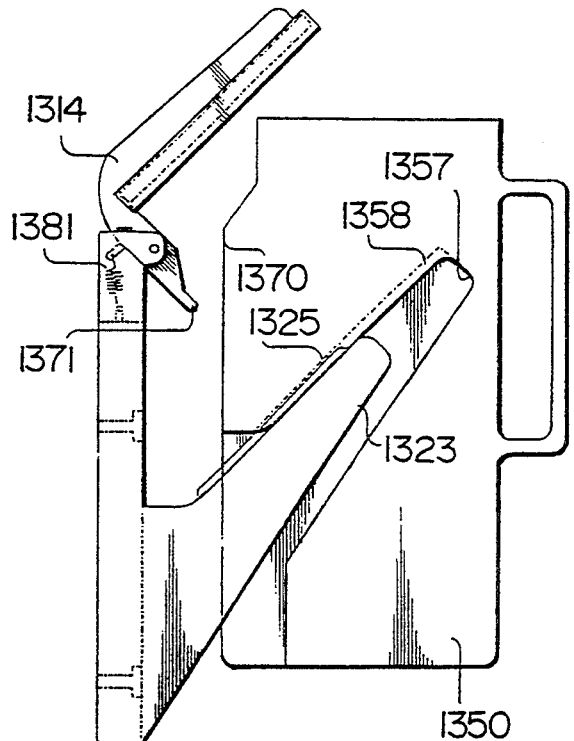

FIGS. 24A–24C show the sequential movement of the withdrawal of the canister 1350 from the carrier 1310. The tapered portion 1382 of the channel 1357 provides ease of alignment. Mechanical stop 1385 provides for the open position of the lid 1314.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. At least one receptacle and mount combination in which said receptacle is selectively removably secured to said mount, said mount comprising: a base, a lower pair of laterally-spaced-apart, angularly-upwardly-projecting support arms projecting from said base, when said base is in a vertical orientation and at lease one upper pivotally-mounted, resiliently-biased outwardly projecting lid;

said receptacle comprising a retangular parallelepiped, open-topped receptacle having two laterally-spaced-apart depressions which are adapted to mate with said laterally-spaced-apart support arms, the spacing of a transverse space between said two laterally-spaced-apart depressions in said receptacle being the same as the space between said pair of support arms, said open top of said receptacle being adapted to be closed by said lid by means of actuated pivoting of said lid with respect to said base through action of an engagement face on the rear edge of said receptacle against a lever depending downwardly from a rear face of said lid.

2. A plurality of receptacles and mount combination of the at least one receptacle and mount combination of claim 1 wherein said mount comprises: a base, a plurality of pairs of said lower support arms projecting from said base, and a plurality of said upper pivotally-mounted, resiliently-biased outwardly-projecting lids; and wherein said receptacles each comprise a rectangular parallelepiped, open-topped canister having two laterally-spaced-apart depressed slots therein which are adapted to mate with said support arms, the spacing of a transverse space between said two laterally-spaced-apart depressed slots in said canister being the same as the space between a co-operative pair of said support arms.

3. The combination of claim 2 wherein said actuated pivoting of said lid to seal said canister is achieved by means of a depending arm on said lid which cooperates with an actuating face on said canister.

4. The combination of claim 2 including at least two said mounts fitted to a base board.

5. The combination of claim 2 including a resilient material within each said lid to seal said open-topped canister.

6. The combination of claim 2 wherein each said pivotally-mounted resiliently-biased lid is biased by cooperation with a fitted spring.

7. The combination of claim 6 wherein each said fitted spring is attached to a protruding post on said lid and said base.

8. The combination of claim 7 wherein each said lid is mounted between a pair of support risers projecting from said base.

9. The combination of claim 8 wherein each said lid is mounted by means of spaced-apart pins on an associated said support riser fitting into a pivot well in each said lid.

10. The combination of claim 2 wherein each said support arm is generally rectangular in cross-section.

11. The combination of claim 10 wherein each said support arm is of a length which is the same as the length of the depressed slot in the canister within which it is adapted to fit.

* * * * *